United States Patent [19]
Meltzer

[11] Patent Number: 5,987,587
[45] Date of Patent: Nov. 16, 1999

[54] SINGLE CHIP MULTIPROCESSOR WITH SHARED EXECUTION UNITS

[75] Inventor: David Meltzer, Wappingers Falls, N.Y.

[73] Assignee: International Business Machines Corporation, Armonk, N.Y.

[21] Appl. No.: 08/870,287

[22] Filed: Jun. 6, 1997

[51] Int. Cl.⁶ .................................................. G06F 13/00
[52] U.S. Cl. .............................................. 712/23; 712/10
[58] Field of Search .................................. 72/10, 214, 23, 72/24; 395/406

[56] References Cited

U.S. PATENT DOCUMENTS

| | | | |
|---|---|---|---|
| 3,611,307 | 10/1971 | Podvin et al. | 395/732 |
| 4,152,763 | 5/1979 | Shimoi | 395/390 |
| 4,445,174 | 4/1984 | Fletcher | 711/121 |
| 4,698,753 | 10/1987 | Hubbins et al. | 395/200.39 |
| 5,117,387 | 5/1992 | Nemirovsky et al. | 364/230 |
| 5,200,564 | 4/1993 | Usami et al. | 84/602 |
| 5,276,893 | 1/1994 | Savaria | 395/182.08 |
| 5,428,803 | 6/1995 | Chen et al. | 395/800.06 |
| 5,511,212 | 4/1996 | Rockoff | 395/800.22 |
| 5,566,303 | 10/1996 | Tashiro | 395/280 |
| 5,685,009 | 11/1997 | Blomgren et al. | 395/800.23 |

OTHER PUBLICATIONS

Gwennap, "Dansoft Develops VLIW Design", Microdesign Resources, p. 21, Feb. 17, 1997.

*Primary Examiner*—Albert De Cady
*Assistant Examiner*—Jason Greene
*Attorney, Agent, or Firm*—George R. Schultz; Akin, Gump, et al.; Volel Emile

[57] ABSTRACT

The present invention relates to multiprocessors which has several microprocessors on a single chip. Efficiency is improved by stripping certain functions that are used less freely from the microprocessor and sharing these functions between several symmetric microprocessors. This method allows each CPU to occupy a smaller area while preserving complete symmetry of capability for software simplification. For example, the shared execution units can include the floating point unit and multimedia execution units.

13 Claims, 6 Drawing Sheets

SINGLE CHIP MULTIPROCESSOR WITH SHARED EXECUTION UNITS

FIELD OF INVENTION

This invention relates to the field of shared memory multiprocessors and in particular to embodiments in which a single semiconductor chip contains a plurality of identical capability processors with a single interface to external resources such as caches, memory or I/O.

BACKGROUND OF THE INVENTION

The single chip embodiment of a shared memory multiprocessor has been well known in the art for several years. Chips with multiprocessors have been built, but to date none with symmetric multiprocessors, i.e., where all processors have identical capability. There are several reasons for the lack of commercial use of this concept relating to the software availability for multiprocessors as well as the difficulty of fitting more than one processor with a shared memory interface on a single die of reasonable size.

FIG. 1 shows a simple superscalar processor 10 with a single instruction queue and single, unified cache. This invention can be applied to much more complicated processor structure. Instructions are fetched from the single ported cache array 12 and loaded into the instruction queue 14 via the result bus 16. The width of the data read from the cache array and the width of the result bus are much greater than a single 32 bit instruction, e.g. 256 bits. This would allow the dispatch of up to 4 instructions per cache read cycle, which for this illustration will be deemed a single machine cycle. Three execution units receive ready instructions from the dispatch logic, at a rate of up to one instruction per execution unit per machine cycle. These units are a branch unit 18, an integer execution unit with integer register file 20 and a floating point unit with floating point register file 22. Memory instructions which require the calculation of an effective address are dispatched to the integer unit and the resulting address is then sent to the memory management unit (MU) 24. Similarly, instruction addresses are generated in the Instruction Fetch Unit 26. Both the MMU and the Instruction Fetch Unit send the addresses to the cache tags 28 and therefore to the array addressing logic. A hit in the tags results in data from the array being placed on the result bus 16. A miss in the cache tags results in a memory request being put on the memory queue 30 and transmitted via the Bus Interface Unit to the external Address and Data bus 32. Each of these units is capable of operating simultaneously resulting in a pipelined superscalar processor with a peak execution rate of 3 instructions per cycle. If the floating point execution unit 22 has a latency of 2 cycles, the pipeline sequence for a single floating point instruction would be fetch, dispatch, decode, execute 1, execute 2, and writeback.

FIG. 2 shows this simple processor 10a extended with the addition of a SIMD style saturating arithmetic multimedia instruction execution unit 34 with its register file. Operation of this unit is similar to the operation of the floating point unit 22. Typically, instructions for this unit do not occur close to floating point operations in the execution sequence of ordinary programs. In fact, in the Intel (tm) MMX architecture, the MMX registers are mapped into the floating point register space and an explicit context switch is needed to enable MMX instructions after floating point instructions have been executed and vice versa.

Building a multiprocessor on a single die would result in a chip similar to those illustrated in FIGS. 3 or 4. Obvious common elements such as the interface 36 to the external bus are shared. Conventional design would also have only one instance on the chip of clock generation, test processor or boundary scan controller, etc. Note that the tag logic and MMU are assumed to have the correct data sharing protocols (e.g. MESI) logic for a multiprocessor. More complex changes are possible when putting more than one processor on a die, such as adding additional levels of caching or more external buses. Such a chip would be large and not have twice the performance of a single processor due to well known multiprocessor effects. However, if the area could be reduced significantly then the instructions executed per second per silicon area, i.e. cost/performance would become equal or better than a uniprocessor. A need exists for a method of splitting these less used functions away from the microprocessor for shared use with other symmetric processors.

SUMMARY OF TIE INVENTION

The present invention relates to multiprocessors which has several microprocessors on a single chip. Efficiency is improved by stripping certain functions that are used less freely from the microprocessor and sharing these functions between several symmetric microprocessors. This method allows each CPU to occupy a smaller area while preserving complete symmetry of capability for software simplification. If this symmetry is not maintained, the software kernel which dispatches threads to processors would have to include required capability and which processor is available as part of its dispatching algorithm. The resulting kernel would be more complicated and slower than one which did not need to take this into account.

A mechanism is shown which allows the sharing of large area computational units on a chip which includes multiple processors. This allows a significant decrease in cost/performance for such a single chip multiprocessor. In addition, it allows adding the multimedia instruction sets to the plurality of processors on the chip at essentially no area penalty over a single chip multiprocessor without such extension.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
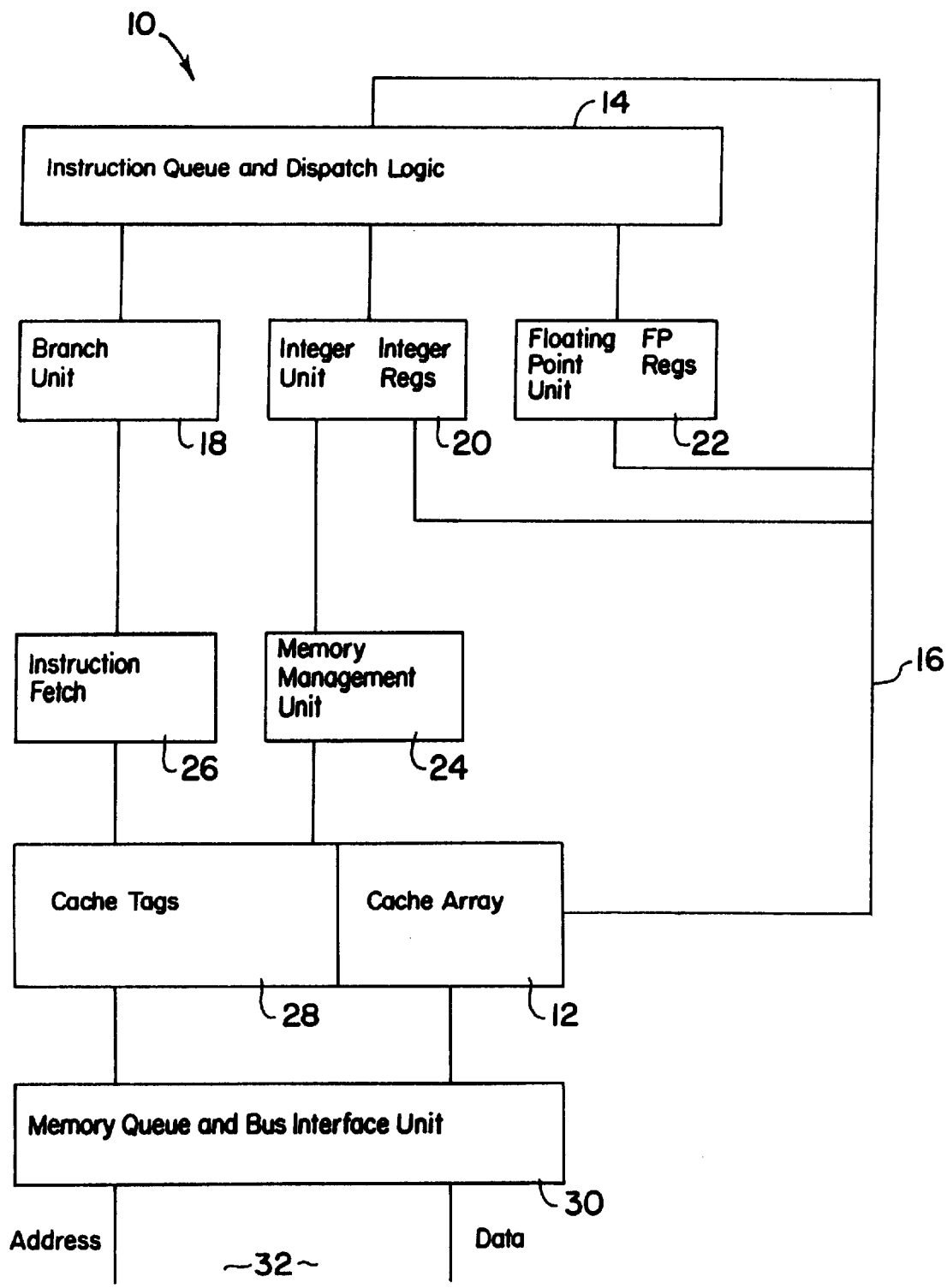
FIG. 1 is a schematic of a typical microprocessor.
Figure 2:
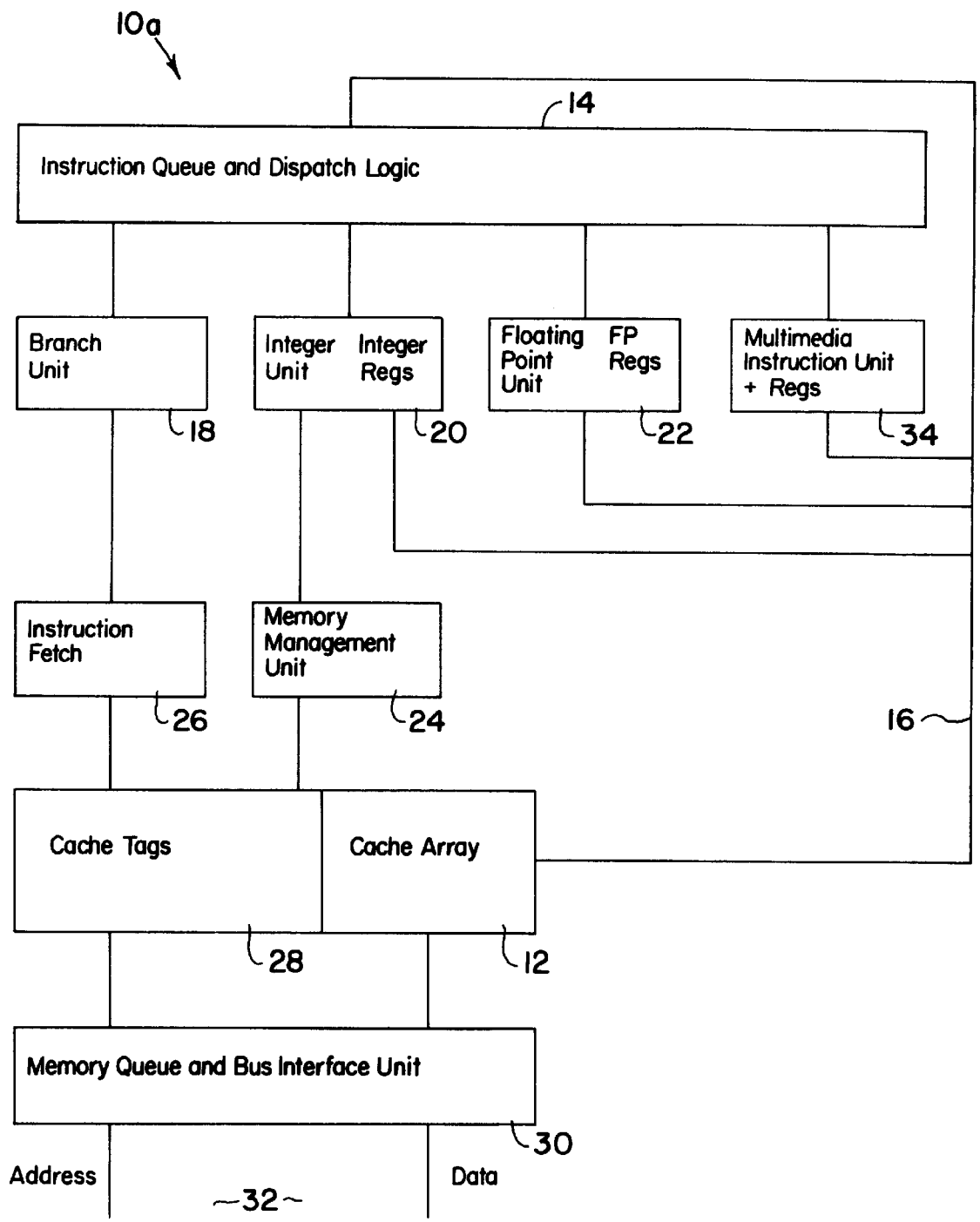
FIG. 2 is a typical microprocessor with a multimedia instruction unit.
Figure 3:
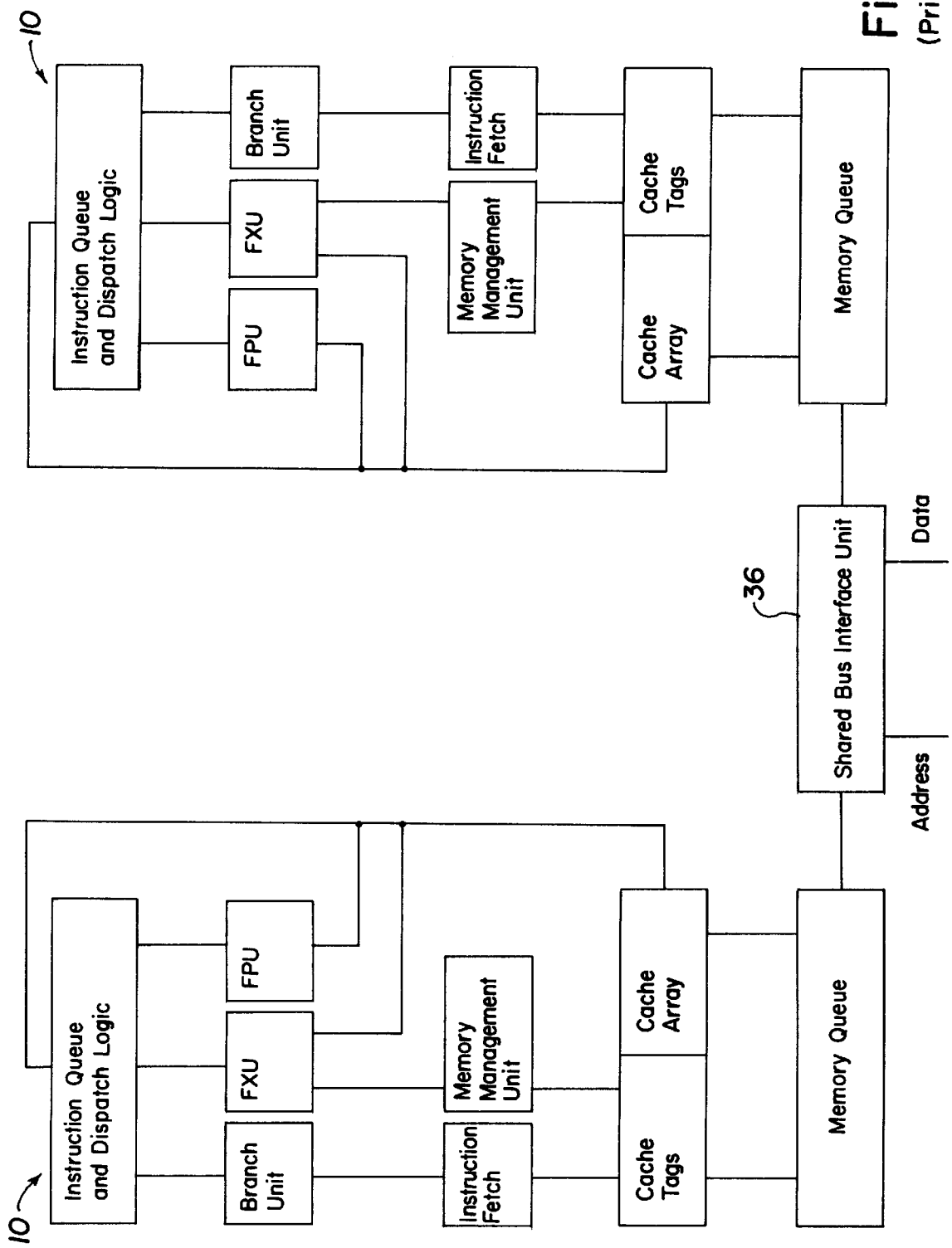
FIG. 3 illustrates two microprocessors on a single chip, each with its own FPU and FXU.
Figure 5:
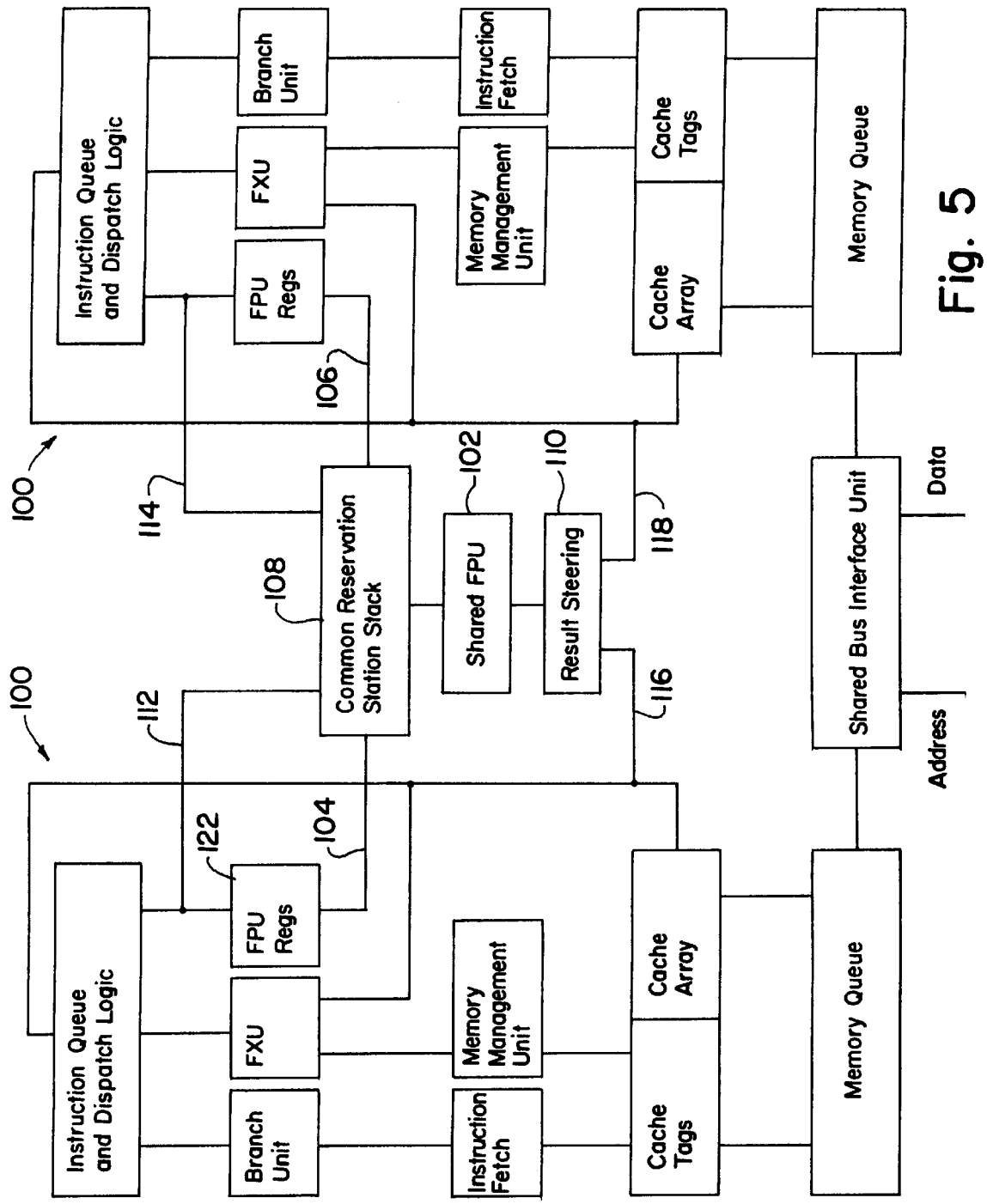
FIG. 5 illustrates two microprocessors sharing a single FPU in accordance with the present invention.
Figure 6:
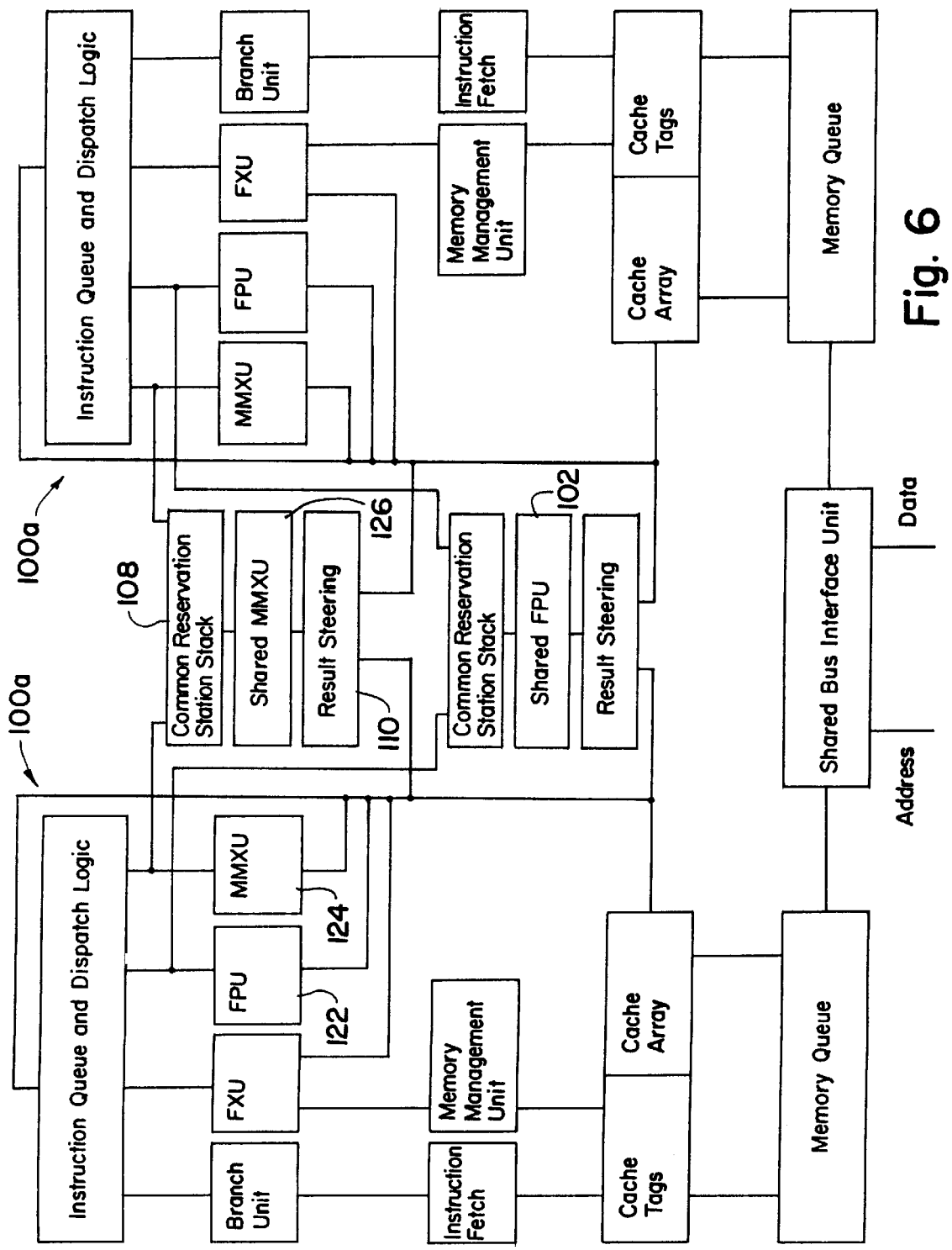
FIG. 6 illustrates two microprocessors sharing a single FPU and a single MMXU.

FIGS. 5 and 6 illustrate two embodiments of the present invention. It is well known that in most programs, floating point instructions occur in bursts separated by integer and control instructions. The more operating system code is executed, the more infrequent is the frequency of execution of floating point instructions. Using this observation, the area of the chip 10 shown in FIG. 3 can be significantly reduced by restructuring as shown in FIG. 5. The floating point unit is removed from each processor 100 and only a local register file 122 is kept. A single floating point unit is placed in an optimum physical location between the two processors to equalize the time of flight of electrical signals from each processor to the said unit. The single floating point execution unit 122 is shared between the instruction streams in each processor.

In order to get the correct results to the correct processor, a shared reservation stack 108 accumulates instructions obtained from the instruction queues via busses 112, 114 and operands from the FP registers via busses 104, 106. Forwarded operands come via the dispatch logic and instruction queues over the previously noted busses 112, 114. Results are steered to the issuing processor via the result steering logic 110 over the connections 116, 118 to the result busses. Simple tagging of the instructions in the reservation station stack 108 allows the correct steering by logic 110. The additional signal delay associated with loading the reservation station and forwarding the result would most likely result in two additional cycles of latency on each floating point operation. The pipeline timing diagram would be fetch, dispatch, decode, data to RS, execute 1, execute 2, forward result and writeback.

The resulting chip as shown in FIG. 5 can execute two instruction streams simultaneously with both processors capable of executing floating point operations. If both processor instruction streams contain floating point operations at the same time, the instructions are basically interleaved by the reservation station logic at the cost of increased latency to each processor. However, the low frequency of floating point operations in most code makes this occurrence unlikely.

Figure 4:
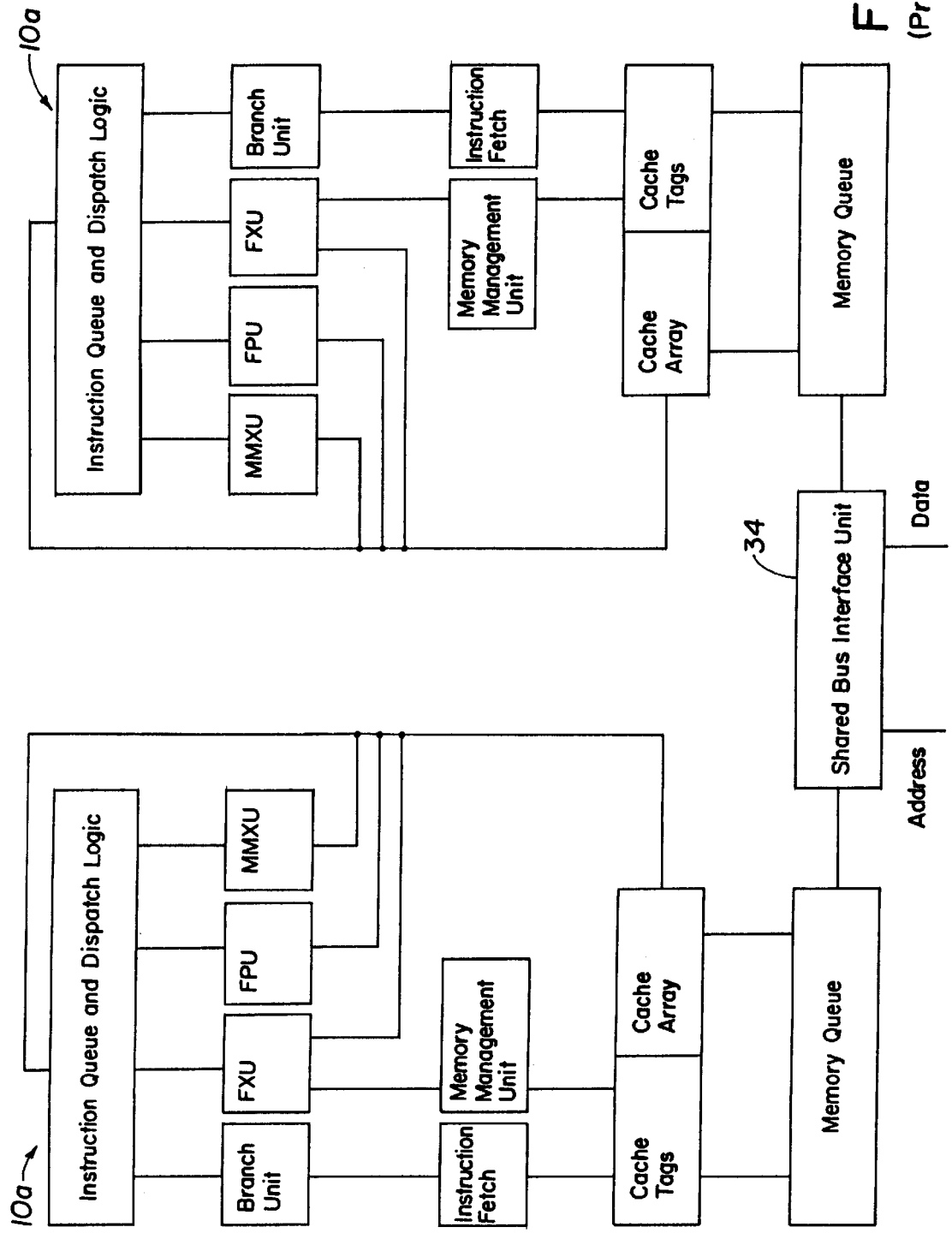
FIG. 4 illustrates two microprocessors on a single chip, each with its own FPU, FXU, and MMXU.

Extending this concept of shared execution units to the multimedia enabled multiprocessor chip of FIG. 4 is shown in FIG. 6. Each processor 100a keeps a private copy of its floating point register 122 and multimedia registers 124 and a single floating point execution unit 102 and multimedia execution unit 126 are shared using central reservation station stack 108 and steering logic 110 for each unit as previously described. Since a long context switch process in involved in each processor between issuing multimedia instructions and issuing floating point instructions and vice versa, when the Me unit is busy for an instruction stream originating on one processor, the floating point unit is available for an instruction stream originating on the other processor. Thus the interference is smaller than would be expected from pure random arrivals. Since both MUX and FP units tend to be large in area, this concept allows adding the multimedia instruction sets to both processor at essentially no area penalty over a single chip multiprocessor without such extension.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A multiprocessor chip comprising;
   (a) a first microprocessor;
   (b) a second microprocessor, wherein the second microprocessor and the first microprocessor have identical capabilities;
   (c) a shared execution unit coupled to both the first and second microprocessors; and
   (d) a shared reservation station coupled to both the first and second microprocessors.

2. The multiprocessor chip of claim 1 wherein said shared execution unit is placed between the first and second microprocessors.

3. The multiprocessor chip of claim 1 wherein said shared execution unit is a floating point unit.

4. The multiprocessor chip of claim 1 wherein said shared execution unit is a multimedia execution unit.

5. The multiprocessor chip of claim 4 wherein both said first and second microprocessors keep a copy of its multimedia registers.

6. The multiprocessor chip of claim 1 wherein said first and second microprocessors comprise a local register file.

7. A multiprocessor chip comprising:
   (a) a first microprocessor;
   (b) a second microprocessor;
   (c) a shared execution unit coupled to both the first and second microprocessors; and
   (d) a shared reservation stack coupled to both the first and second microprocessors.

8. The multiprocessor chip of claim 7 wherein said shared reservation stack comprises means to accumulate instructions from an instruction queue.

9. The multiprocessor chip of claim 7 wherein said shared reservation stack comprises means to accumulate operands from the floating point registers.

10. The multiprocessor chip of claim 1 further comprises means for steering a result from a shared execution unit to either the first or second microprocessor.

11. A multiprocessor chip comprising:
    (a) a first microprocessor;
    (b) a second microprocessor;
    (c) a shared execution unit coupled to both the first and second microprocessors; and
    (d) means for steering a result from a shared execution unit to either the first or second microprocessor, wherein the means for steering includes means for tagging of instructions in a reservation station stack.

12. The multiprocessor chip of claim 7, wherein said shared execution unit is a multimedia execution unit.

13. The multiprocessor chip of claim 1 wherein said reservation station includes a shared reservation stack.

* * * * *